(12) United States Patent
Kentris

(10) Patent No.: US 12,543,702 B1
(45) Date of Patent: Feb. 10, 2026

(54) PET WEANING BOWL

(71) Applicant: Chelsea Kentris, Honolulu, HI (US)

(72) Inventor: Chelsea Kentris, Honolulu, HI (US)

( * ) Notice: Subject to any disclaimer, the term of this patent is extended or adjusted under 35 U.S.C. 154(b) by 0 days.

(21) Appl. No.: 18/896,184

(22) Filed: Sep. 25, 2024

(51) Int. Cl.
*A01K 5/01* (2006.01)

(52) U.S. Cl.
CPC .................................. *A01K 5/0114* (2013.01)

(58) Field of Classification Search
CPC .. A01K 5/0114; A01K 5/0121; A01K 5/0128; A01K 5/0135; A01K 5/0142
See application file for complete search history.

(56) References Cited

U.S. PATENT DOCUMENTS

| | | | | |
|---|---|---|---|---|
| 3,664,304 A | * | 5/1972 | Carter | A01K 39/014 119/61.5 |
| 4,436,056 A | | 3/1984 | MacLeod | |
| 4,658,759 A | * | 4/1987 | Brown | A01K 5/0114 119/61.5 |
| D291,527 S | * | 8/1987 | Notbohm | D7/367 |
| D296,485 S | * | 6/1988 | Peterson | D30/132 |
| D338,088 S | * | 8/1993 | Bailey | D30/131 |
| 5,775,255 A | * | 7/1998 | Louviere, III | A01K 5/0142 119/51.5 |
| D399,029 S | * | 9/1998 | Falcone | D30/130 |
| 5,975,016 A | | 11/1999 | Wesenhagen | |
| 6,032,824 A | | 3/2000 | Barrow | |
| D695,541 S | * | 12/2013 | Dunn | B65F 1/062 D6/515 |
| D703,393 S | | 4/2014 | Henley | |
| D950,861 S | * | 5/2022 | Tu | D30/132 |
| 11,324,195 B2 | | 5/2022 | Rice | |
| D973,972 S | | 12/2022 | Nishino | |
| 2004/0194716 A1 | | 10/2004 | Morrison | |
| 2011/0180006 A1 | * | 7/2011 | McGowan | A01K 39/014 119/61.54 |
| 2020/0396961 A1 | * | 12/2020 | Zetouna | A23K 20/26 |
| 2022/0400650 A1 | * | 12/2022 | Hagenow | A01K 7/00 |
| 2025/0275517 A1 | * | 9/2025 | O'Callaghan | A01K 7/005 |

FOREIGN PATENT DOCUMENTS

| | | | | |
|---|---|---|---|---|
| KR | 2015001315 U | * | 4/2015 | A01G 9/00 |
| WO | WO-0060926 A1 | * | 10/2000 | A01K 5/0135 |
| WO | WO2013088200 | | 6/2013 | |

* cited by examiner

*Primary Examiner* — Ebony E Evans

(57) ABSTRACT

A pet weaning bowl includes a bottom, a side wall, and a trough. The bottom and the side wall define an interior space to hold dry pet food. The side wall includes an upper edge defining an opening into the interior space. The trough is mounted on the upper edge to hold wet pet food. The trough includes a flexible resilient material to permit pets recently born to easily and comfortably access wet pet food and thereby be directed toward dry pet food in the interior space.

7 Claims, 4 Drawing Sheets

PET WEANING BOWL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet food dishes and bowls and more particularly pertains to a new pet weaning bowl for helping wean pets recently born, such as kittens and puppies, from milk or wet pet food to dry pet food, such as kibble. Kittens, for example, feed off the milk of their mothers until they are old enough to consume solid food. However, in some situations, such as if the kittens have been orphaned or abandoned, the weaning process needs to be accelerated to promote survival and increase care options, as often kittens who require extensive care in shelters are euthanized or die due to lack of resources. Very young kittens though have difficulty eating solid food because the kittens are geared for the warm soft contact with the teats of their mothers, so hard food in a hard bowl is not attractive, and sometimes can be distasteful if the kitten bites down on the hard bowl. In contrast, kittens find wet pet food very attractive due to its strong odor and soft texture. Unfortunately, wet pet food is expensive and requires more effort to serve, so dry pet food is preferred, especially in shelters that may be short on human volunteers and staff. The present invention provides a transition from wet pet food to dry pet food that works quickly with minimal intervention from staff by placing the wet pet food in a customized trough on a bowl for dry pet food. The wet pet food draws in the kitten or puppy, which then leads the pet to the dry pet food based on the positive experience with the wet pet food.

(2) Description of Related Art Including Information Disclosed Under 37 CFR 1.97 and 1.98

The prior art relates to pet food dishes and bowls. The prior art, as best understood, does not disclose a pet weaning bowl that has a bottom, a side wall, and a trough, which trough is mounted on the upper edge to hold wet pet food and is made of a flexible resilient material to permit pets recently born to easily and comfortably access wet pet food and thereby be directed toward dry pet food in the interior space.

BRIEF SUMMARY OF THE INVENTION

An embodiment of the disclosure meets the needs presented above in a pet weaning bowl generally comprising a bottom, a side wall, and a trough. The bottom and the side wall define an interior space to hold dry pet food. The side wall includes an upper edge defining an opening into the interior space. The trough is mounted on the upper edge to hold wet pet food. The trough includes a flexible resilient material to permit pets recently born to easily and comfortably access wet pet food and thereby be directed toward dry pet food in the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
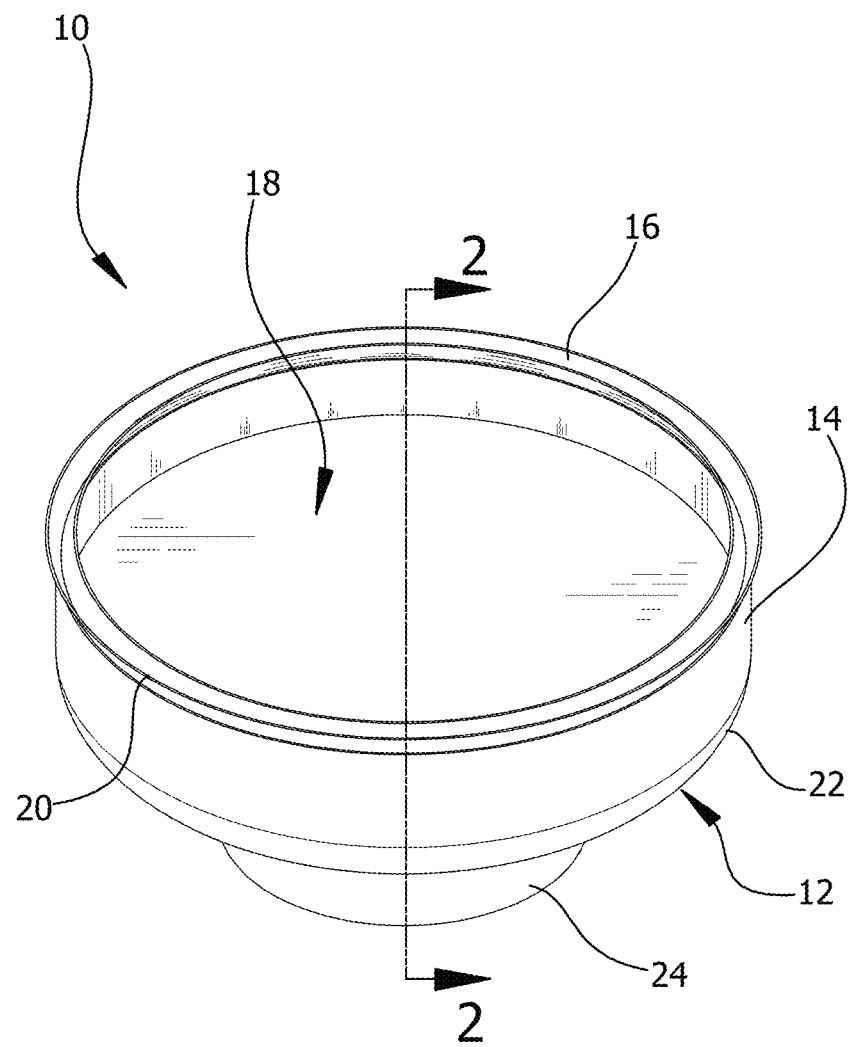
FIG. 1 is a perspective view of a pet weaning bowl according to an embodiment of the disclosure.

With reference now to the drawings, and in particular to FIGS. 1 through 4 thereof, a new pet weaning bowl embodying the principles and concepts of an embodiment of the disclosure and generally designated by the reference numeral 10 will be described.

As best illustrated in FIGS. 1 through 4, the pet weaning bowl 10 generally comprises a bottom 12, a side wall 14, and a trough 16. The bottom 12 and the side wall 14 define an interior space 18 to hold dry pet food 60. The side wall 14 includes an upper edge 20 defining an opening into the interior space 18. The trough 16 is mounted on the upper edge 20 to hold wet pet food 62. The trough 16 is made of a flexible resilient material to permit pets recently born to easily and comfortably access wet pet food 62 and thereby be directed toward dry pet food 60 in the interior space 18.

Figure 2:
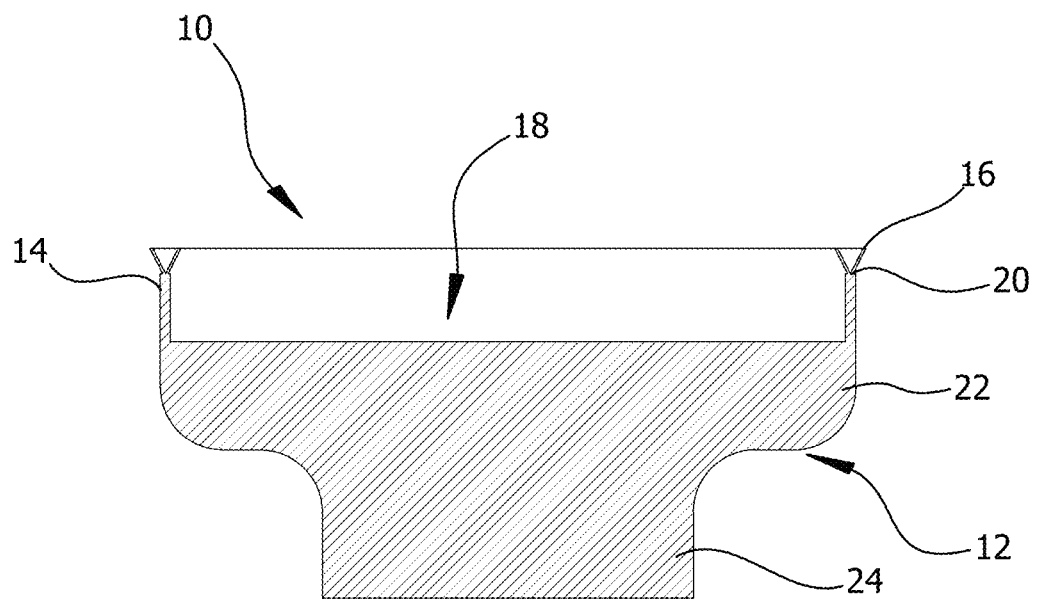
FIG. 2 is a side cross-sectional view of an embodiment of the disclosure.
Figure 4:
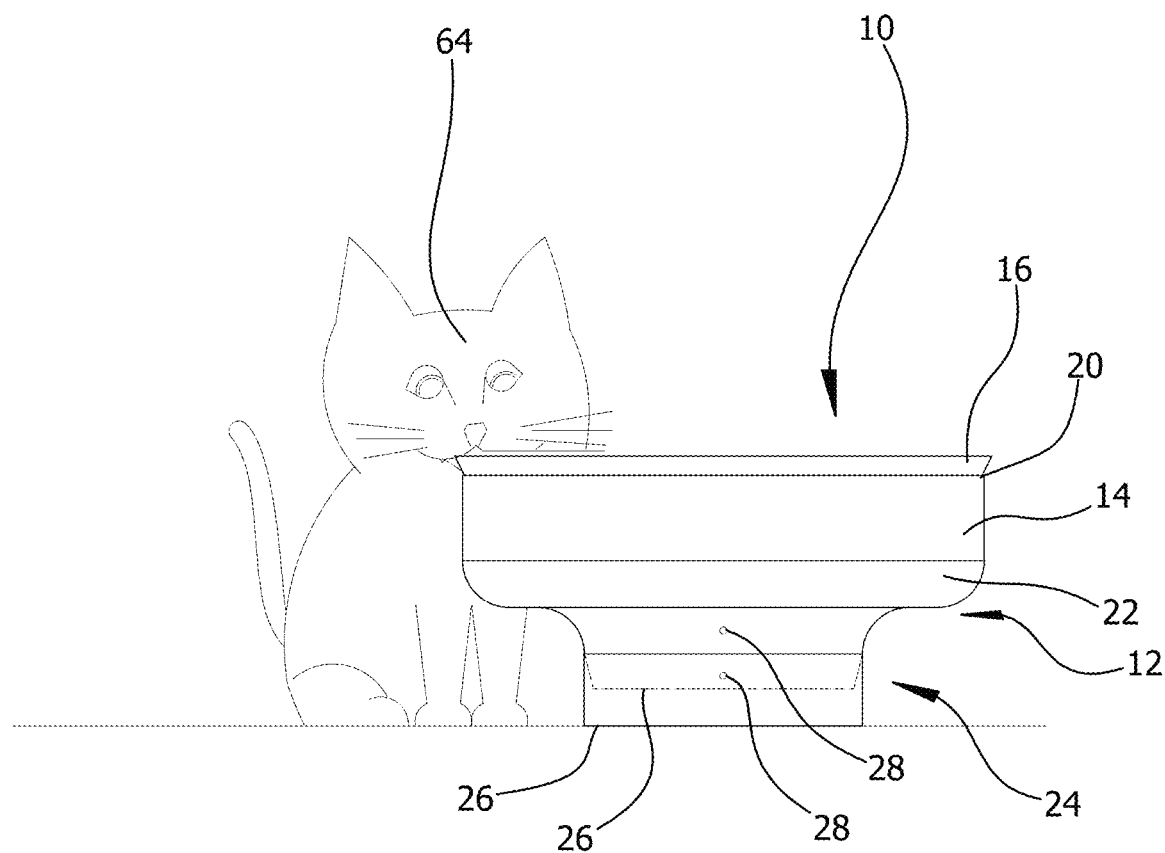
FIG. 4 is a side view of an embodiment of the disclosure in use.

While the pet weaning bowl 10 can have a traditional bowl design, in the exemplary embodiment shown in FIG. 2, the bottom 12 includes a body portion 22 and a support stand 24 extending therefrom to elevate the cylindrical body portion 22. The elevated design allows easier access for pets to get to the wet pet food 62 and dry pet food 60 since the food is closer to the mouth of the pet, as shown in FIG. 4 and discussed further below. The support stand 24 can be solid as shown in FIG. 2, or it can be adjustable in height as shown in FIG. 4 using any well-known adjustment mechanism, such as two telescoping sections 26 with push pins 28. In one possible embodiment, the support stand 24 is adjustable in a range of about 2.0 to 4.0 inches. For either the solid or adjustable design, the support stand 24 can be made of heavy material, such as heavy-duty plastic, to minimize tipping.

The bottom 12 and the side wall 14 are joined together in a one-piece structure as shown in FIG. 2. In one possible embodiment, the bottom 12 is about 3.0 to 5.0 inches in width, though in other embodiments the bottom 12 could be wider. The interior space 18 is shallow to facilitate access to dry pet food 60 therein. In one possible embodiment, the side wall 14 is about 0.5 to 1.0 inch in height.

For the trough 16, the flexible resilient material is silicone, though other suitable materials could be used, such as rubber or other elastomers. In the exemplary embodiment shown in FIG. 2, the trough 16 is essentially V-shaped. However, the trough 16 could be rounded or tubular with a slot or openings therein. Essentially any design is possible provided it is flexible and relatively easily filled and cleaned. In one possible embodiment, the trough 16 is about 0.25 inch deep and about 0.25 inch wide at the top, or whatever dimensions are suitable for the mouth of the pet, such as a kitten or a puppy.

Figure 3:
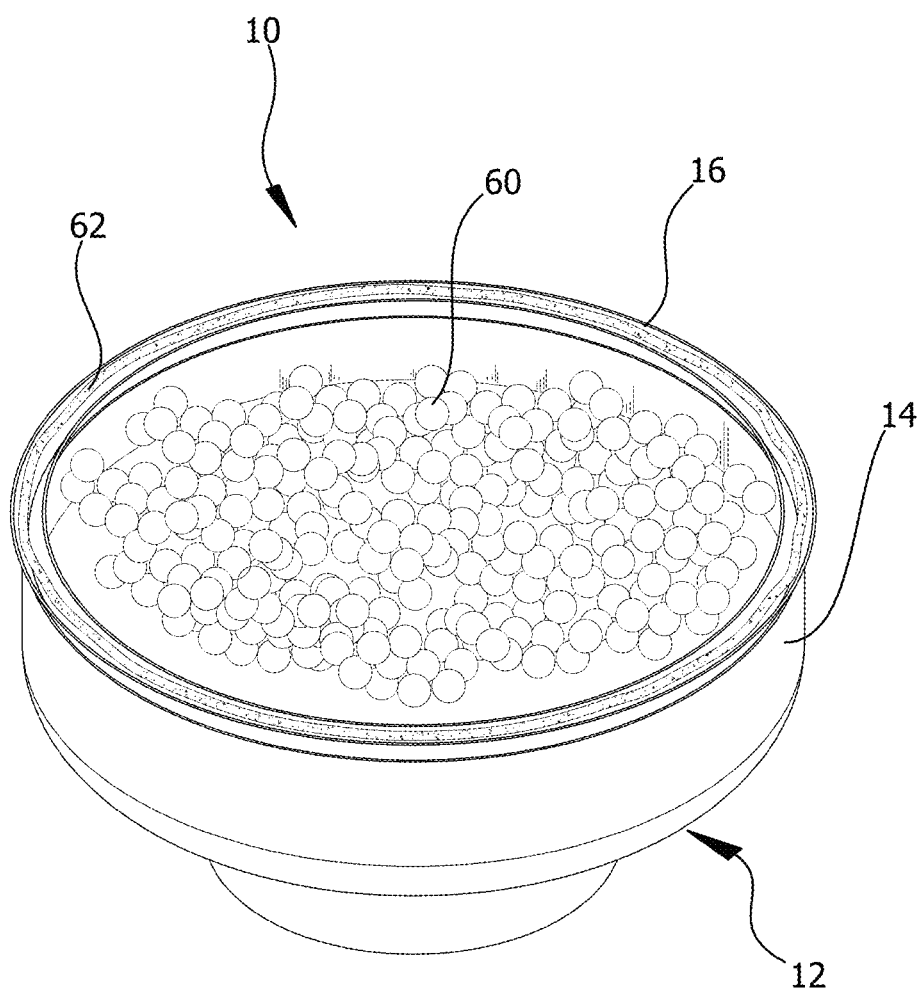
FIG. 3 is a perspective view of an embodiment of the disclosure in use.

As mentioned above, the pet weaning bowl 10 is used to wean pets that have been recently born, such as kittens and puppies. As shown in FIG. 3, the user simply places dry pet food 60 in the interior space 18 and wet pet food 62 in the trough 16. The wet pet food 62 can be inserted using a spoon or other utensil, or possibly a piping bag. With reference to FIG. 4, the wet pet food 62 draws the pet, in this case a kitten 64, with the strong aroma. The kitten 64 then begins eating the wet pet food 62, which is easily accessible, and the soft material mimics the teats of a female, thereby encouraging the kitten 64 to eat. The kitten 64 can actually bite down on the soft trough 16 without harming the teeth or mouth of the kitten 64. As the kitten 64 associates good food and good feeding experiences with the pet weaning bowl 10, the kitten 64 will eventually start eating the dry pet food 60, thereby promoting and encouraging the weaning process. When the kitten 64 is done eating, the user can easily wipe down the trough 16 with a cloth or use a bottle or pipe cleaner. As discussed above, for embodiments that include an adjustable support stand 24, the height can be adjusted to best match the height of the pet, which can be advantageous for places like shelters that have multiple pets of different heights.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet weaning bowl comprising:
    a bottom and a side wall defining an interior space to hold dry pet food, said side wall comprising an upper edge defining an opening into said interior space, wherein said bottom comprises a cylindrical body portion and a support stand, said support stand being cylindrical and concentric with said cylindrical body portion, said support stand having a diameter less than a diameter of said cylindrical body portion, said support stand extending downwardly from said cylindrical body portion to elevate said cylindrical body portion; and
    a trough mounted on said upper edge to hold wet pet food, wherein said trough comprises a flexible resilient material to permit pets recently born to easily and comfortably access wet pet food and thereby be directed toward dry pet food in said interior space, said trough being V-shaped having a base and two sides of equal length extending from said base such that distal edges of said sides relative to said base are coplanar.

2. The pet weaning bowl of claim 1, wherein said bottom and said side wall are joined together in a one-piece structure.

3. The pet weaning bowl of claim 1, wherein said support stand is adjustable in height.

4. The pet weaning bowl of claim 3, wherein said support stand is adjustable in a range of about 2.0 to 4.0 inches.

5. The pet weaning bowl of claim 1, wherein said bottom is about 3.0 to 5.0 inches in width.

6. The pet weaning bowl of claim 1, wherein said side wall is about 0.5 to 1.0 inch in height.

7. The pet weaning bowl of claim 1, wherein said flexible resilient material comprises silicone.

* * * * *